3,209,002
NOVEL URINARY ANTISEPTICS
Alexander Galat, 126 Buckingham Road, Yonkers, N.Y.
No Drawing. Filed Dec. 17, 1962, Ser. No. 244,928
5 Claims. (Cl. 260—248.5)

This invention relates to new compounds useful as urinary antiseptics and in particular to hexamethylenetetramine - di - ($\alpha$ - acylamido - $\gamma$ - methylmercaptobutyrate) compounds.

Infections of the urinary tract are among the most frequently encountered and most difficult to manage of all infections. They are second in frequency only to the infections of the respiratory tract. Urinary infections have been implicated in such disorders as hypertension, chronic renal insufficiency, toxemias of pregnancy, diabetes and other aliments.

At present urinary infections are managed by the administration of antibiotics, sulfonamides and nitrofurans. However, these drugs are often ineffective or cannot be used because of toxicity, bacterial resistance, allergy and similar factors. This is particularly true when dealing with chronic infections of the urinary tract which constitute about eighty percent of such infections.

The emergence of resistant organisms, the ineffectiveness of the above mentioned drug, the rise in the geriatric population, improved diagnostic methods and facilities, all contribute to the fact that urinary infections have come to be a major problem in medicine today.

Methenamine, alone or in the form of its various salts, has been used by the prior art as a urinary antiseptic. It has a number of important advantages over other urinary antiseptics, such as antibiotics, sulfonamides, furans, etc. It is well tolerated, has low toxicity and is inexpensive and is therefore often used, especially in treating chronic infections. It is excreted unchanged in the urine. In an acid urine medium methenamine hydrolyzes to produce formaldehyde which kills the infecting organisms and it is therefore potentially an effective bactericide. Further, in contrast to other urinary antiseptics, it does not give rise to resistant bacterial strains.

However, since methenamine is active only in an acid medium, the pH of the urine must be below 6.0 and preferably close to 5.0 for methenamine to exhibit its activity. At pH 6.0 or above and particularly in an alkaline urine methenamine is completely devoid of antiseptic action. Table I shows the dependence of the formaldehyde release from methenamine, and therefore of the bactericidal activity, on the pH of the medium.

TABLE I.—PERCENT HYDROLYSIS OF METHENAMINE AS A FUNCTION OF pH

| pH | Perfect hydrolysis of methenamine |
|---|---|
| 5.0 | 20 |
| 5.5 | 17 |
| 6.0 | 7 |
| 6.5 | 3 |
| 7.7 | 0 |

While normal urine is usually very slightly acidic, when an infection of the urinary tract exists, the urine generally exhibits an alkaline reaction. This is due primarily to bacterial decomposition of urea and other nitrogenous elimination products which results in the production of ammonia. Thus, more frequently than not, pathogenic conditions produce an environment in which methenamine is incapable of exhibiting its antiseptic action. Also, it is to be noted that the hydrolysis of methenamine produces ammonia and accordingly aside from any other considerations, this hydrolysis of methenamine tends to produce an environment that retards and finally prevents further production of formaldehyde.

Many attempts have been made to eliminate the above described limitation of methenamine as a urinary antiseptic. Thus, it has been recommended that a salt exhibiting an acid reaction, such as ammonium chloride, ammonium nitrate, sodium acid phosphate and the like, be administered in admixture with methenamine. However, large dosages of such salts must be given in order to make urine acidic and even then the acidification of the urine does not occur with all patients or occurs only for a short period of time. Further, these large dosages cause gastrointestinal irritation.

Another approach which has been employed by the prior art to produce an acid urine involves administering methenamine in the form of a salt of an organic acid. It was postulated that the administration of these compounds would result in the production of the acid environment in the urine required for manifestation of the antiseptic action of methenamine.

Salts of methenamine with such acids as anhydromethylenecitric, acetylsalicyclic, borocitric, citrosulfuric, mandelic, phenoxyacetic, salicylic, sulfosalicyclic, salicyloxyacetic, sulfoxylic and the like have been prepared and tested as urinary antiseptics with unsuccessful or erratic and unreliable results. At least in part the reason for these failures lies in the following: when an acid is administered to a subject, the natural physiological reaction is to produce sufficient alkali to neutralize the acid and excrete it in the form of a neutral salt in the urine. The production of additional alkali may take only a few hours, or a few days, depending on the nature of the acid and the amount. However, once the physiological adjustment to the acid load is made by the subject, the pH of the urine returns to above 6.0 and further administration of the acid has no effect on the pH. It is therefore evident that if the infection is not cured by these salts within the relatively short period during which the organism adjusts itself to the acid load, further methenamine therapy becomes useless.

Because of the potent bactericidal properties of formaldehyde, when in the urine, methenamine therapy could be invariably uccessful if the pH of urine could be maintained at 6.0 or below for as long a period as is necessary to clear the infection.

It is, therefore, an object of this invention to provide new methenamine compounds useful for the management of urinary infections.

Another object of this invention is to provide urinary antiseptics having a broad spectrum of bactericidal activity.

A further object of this invention is to provide urinary antiseptics that do not cause the emergence of resistant strains of bacteria.

A still further object of this invention is to provide urinary antiseptics of low toxicity which can be administered over prolonged periods for the management of chronic infections.

Another object of this invention is to provide urinary antiseptic methenamine compounds and compositions that will maintain the pH of the urine at below 6.0 for prolonged periods.

The objects of this invention are accomplished by compounds of the following chemical formula:

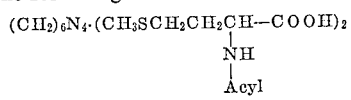

The structural formula can also be written as follows:

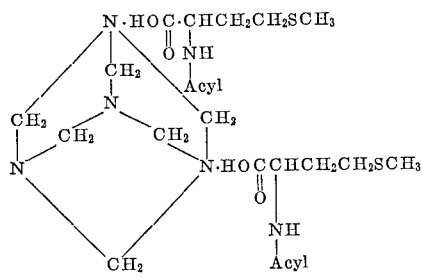

where acyl is an aliphatic or carbocyclic acyl radical.

The compounds of this invention are named as hexamethylenetetramine-di-($\alpha$-acylamido-$\gamma$-methylmercaptobutyrate). For purposes of the following description the compounds will be referred to as N-acyl-dl-methionine.methenamine since the components are more commonly named in this fashion by the prior art.

It has now been discovered that when the N-acyl-methionine.methenamine compounds of the present invention are administered to patients, they are rapidly absorbed and metabolized and excreted in the urine in the form of acid sulfate salts of methenamine, or, in any event, as the following ions: acid sulfate, and methenamine. The excretion of these ions results in a sharp drop of the urinary pH (below 6.0) which can be maintained for very prolonged periods, for example, for several months, if desired. Table I illustrates the percent by weight of the free formaldehyde as a function of pH. By the proper dosage of the compounds of this invention it is possible to maintain the urinary pH at about 5.0, at which level there is an effective and persistent concentration of formaldehyde present in the urinary tract. As can be seen from Table I this means that 20% of the available methenamine in the urine is hydrolized. It was thus found the compounds of this invention were highly effective urinary antiseptics which exhibited a broad spectrum of antibacterial activity.

The following example illustrates the method for the preparation of N-acyl-dl-methionine.methenamine and in particular N-acetyl-dl-methionine.methenamine.

*Example I*

N-acetyl-dl-methionine ($\alpha$-acetylamido-$\gamma$-methylmercaptobutyric acid) 19.1 g. (0.1 mole) and methenamine (hexamethylenetetramine) 7.0 g. (0.05 mole) were heated under reflux with 130 ml of chloroform until the solids went in solution. Toluene (150 ml.) was then added and the mixture allowed to crystallize over night. The product was filtered, washed with a mixture of chloroform and toluene and dried. The yield was 23 g. (88%) of N-acetyl-dl-methionine.methenamine. This compound had a sharp melting point of 125–126° C., and a neutral equivalent of 264 (theory: 261). It is a white, crystalline compound, stable in the air, possessing a relatively pleasant taste and extremely soluble in water. Recrystallization from hot isopropanol did not change the composition or the properties of the compound.

*Example II*

N-benzoyl-dl-methionine ($\alpha$-benzoylamido-$\gamma$-methylmercaptobutyric acid) 25.3 g., 0.1 mole was reacted with methenamine (hexamethylenetetramine) 7.0 g. (0.05 mole) by the method of Example I. The resulting compound N-benzoyl-dl-methionine.methenamine melted unsharply at about 110° C. In contrast with the N-acetyl derivative of Example I this compound did not give a clear solution with water probably because of hydrolysis and the formation of the insoluble N-benzoyl-dl-methionine.

The N-acyl group in the methionine compounds utilized in this invention is necessary in order to make the methionine sufficiently acidic to react with the methenamine. Methionine itself (unsubstituted) will not react with methenamine. Further, even though methenamine is a polyfunctional amine, it has been found that it will combine with only two moles of the N-acyl methionine.

The preferred compound of this invention is N-acetyl-dl-methionine.methenamine. Related N-propionyl, N-butyryl, N-valeryl and other N-lower aliphatic acyl compounds offer no therapeutic advantage over the N-acetyl compound, while technologically they are somewhat more difficult to prepare and are more expensive. However, N-lower aliphatic acyl compounds having eight or less carbon atoms in the aliphatic group are contemplated by this invention. The carbocyclic, in particular aromatic, analogs, such as the N-benzoyl compound, are also more difficult to prepare and are usually incompletely soluble in water due to partial hydrolysis or dissociation. However, this latter situation can be remedied and the compounds can be made completely soluble in water by repressing the hydrolysis by the use of an excess of methenamine in admixture with the N-carbocyclic compound. Thus, in general N-acyl compounds are suitable, however, the N-acetyl compound is preferred.

Thus, for reasons given above, the preferred compound of this invention is the N-acetyl-dl-methionine.methenamine, which has the following structure:

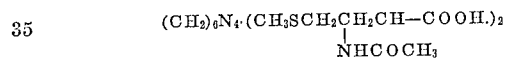

The structural formula can be further represented as follows:

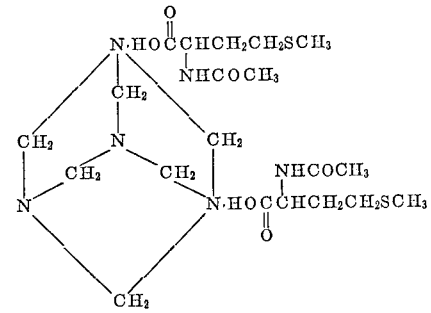

Its chemical name is hexamethylenetetramine-di-($\alpha$-acetylamido-$\alpha$-methylmercaptobutyrate).

The normal acidity of human urine is due to the excretion of inorganic acid sulfates and phosphates. The prior art considered probable that the presence of these inorganic salts in the urine could be increased by the administration of inorganic acid sulfates or phosphates in admixture with methenamine and thus it would be possible to produce an acidification of the urine that could be maintained for prolonged periods. Unfortunately, the absorption of these inorganic salts from the gastro-intestinal tract is very poor and thus this method of acidification of the urine has met with unsatisfactory results. Attempts have also been made to increase the formation of acid sulfates by the administration of organic sulfur compounds such as methionine and also by the administration of the elemental sulfur itself in mixture with methenamine, but because of the relatively low solubility of such compounds they exhibit a strong irritating effect on the gastro-intestinal mucosa and cannot be used in sufficient amounts and over sufficiently prolonged periods to produce the desired result.

The preferred N-acetyl-dl-methionine.methenamine of this invention is soluble to the extent of 150–200 g. in 100 ml. of water. It is thus about 50 times more soluble than dl-methionine, the solubility of which is only about 3.5 g. in 100 ml. of water, and it is, of course, infinitely more soluble than sulfur, which is a relatively insoluble element.

The preferred N-acetyl-dl-methionine.methenamine is an exceptionally well tolerated compound and even large and frequent doses, such as for example, one gram every hour, produce no discomfort, irritation or any gastro-intestinal reaction. This highly desirable property is believed to be due to its high solubility and consequent rapid absorption and evacuation from the gastro-intestinal tract. This rapid absorption greatly facilitates transfer to the sites of oxidation in the body with the result that within a very short period there is a sharp drop in the urinary pH. Thus, usually the pH will drop from 6.5 to 5.3 within about two hours following the administration of a single one gram dose of this compound.

Finally, the high solubility of the preferred N-acetyl-dl-methionine.methenamine makes possible preparations that can be administered in liquid form. Thus, an adult dose 1 g.) can be given in a teaspoonful (5 ml.) by the use of a 20% aqueous solution. For children, a 50% solution may be used whereby a therapeutic dose (0.5 g.) will be contained in 10 drops. Such liquid dosage forms are not possible with the prior art mixtures.

The urinary acidification with the compounds of this invention can apparently be maintained indefinitely. Thus, for example, after almost three months of continuous administration of the preferred N-acetyl-dl-methionine.methenamine there was no evidence of renal adjustment such as invariably takes place with other urinary antiseptics preparations and which finally results in the return of the urinary pH to the undesirably high levels.

An explanation of the action of the compounds of this invention is that in the prior attempts at urine acidification as by the administration of organic acids the effect was dependent upon the excretion of the acids unchanged in the urine, while in the case of the N-acyl-methionine.-methenamine compounds of this invention the acidification of the urine depends on the metabolic changes that these compounds undergo in the organism. The metabolism of the compounds of this invention results in the increased excretion of acid sulfates in the urine, resulting in an acid condition. This acid condition appears to be maintainable almost indefinitely.

The compounds of this invention are inexpensive to prepare and the reactive components are readily available. As mentioned above, one of the major applications of the compounds of this invention is in the treatment of chronic urinary infections which constitute about eighty percent of all such infections. In the management of chronic conditions the medication must be given for prolonged periods (months) and the cost of the therapeutic agent is an important consideration. The compounds of this invention are readily prepared in good yield starting from the inexpensive dl-methionine, subjecting it to conventional acylation with inexpensive acid anhydrides, such as acetic anhydride, or acid chlorides, such as benzoyl chloride, followed by the reaction with inexpensive methenamine, by the reaction illustrated in Examples I and II. The resulting compounds are thus comparatively inexpensive.

Further, substantial economy results from the fact that the compounds of this invention are readily tolerated and produce no irritation in the gastro-intestinal tract which permits the administration of these compounds in the form of inexpensive, uncoated tablets. This is in contrast to many other urinary antiseptics which must be administered in the form of enteric-coated tablets at a substantially increased cost.

While the foregoing is a specific description of this invention, it is intended that this invention be limited only by the hereinafter appended claims.

I claim:
1. Hexamethylenetetramine - di - ($\alpha$ - carbovylic acylamido-$\gamma$-methylmercaptobutyrate) wherein the acyl group is selected from the group consisting of lower aliphatic carboxylic acyl groups and carbocyclic carboxylic acyl groups, the carbocyclic groups containing 5 to 7 carbon atoms.
2. Hexamethylenetetramine - di - ($\alpha$ - lower aliphatic carboxylic acylamido-$\gamma$-methylmercaptobutyrate).
3. Hexamethylenetetramine - di - ($\alpha$ - acetylamido - $\gamma$-methylmercaptobutyrate).
4. Hexamethylenetetramine - di - ($\alpha$ - carbocylic carboxylic acylamido-$\gamma$ - methylmercaptobutyrate) wherein the carbocyclic group contains from 5 to 7 carbon atoms.
5. Hexamethylenetetramine-di-($\alpha$ - benzoylamido - $\gamma$-methylmercaptobutyrate).

References Cited by the Examiner
UNITED STATES PATENTS

| | | | |
|---|---|---|---|
| 979,916 | 12/10 | Barell et al. | 260—248.5 |
| 2,579,494 | 12/51 | Hermann | 260—248.5 |
| 2,764,581 | 9/56 | Scholz et al. | 260—248.5 |
| 2,967,130 | 1/61 | Sanders et al. | 167—65 |
| 3,081,230 | 3/63 | Weinstock et al. | 167—65 |

WALTER A. MODANCE, *Primary Examiner.*
JULIAN S. LEVITT, *Examiner.*